United States Patent
Cooley et al.

(10) Patent No.: US 7,606,143 B2
(45) Date of Patent: Oct. 20, 2009

(54) SYSTEM AND METHOD FOR ADVANCED FAIL-OVER FOR PACKET LABEL SWAPPING

(75) Inventors: Jim E. Cooley, Las Vegas, NV (US); Michael K. Bugenhagen, Olathe, KS (US)

(73) Assignee: Embarq Corporation, Overland Park, KS (US)

( * ) Notice: Subject to any disclaimer, the term of this patent is extended or adjusted under 35 U.S.C. 154(b) by 406 days.

(21) Appl. No.: 11/712,095

(22) Filed: Feb. 28, 2007

(65) Prior Publication Data

US 2008/0205263 A1    Aug. 28, 2008

(51) Int. Cl.
*H04J 1/16* (2006.01)
(52) U.S. Cl. .................... 370/218; 370/252
(58) Field of Classification Search ............... 370/218, 370/252
See application file for complete search history.

(56) References Cited

U.S. PATENT DOCUMENTS

| | | | | |
|---|---|---|---|---|
| 6,477,141 | B1 * | 11/2002 | Izawa et al. | 370/219 |
| 6,810,011 | B1 * | 10/2004 | Betts | 370/228 |
| 7,433,362 | B2 * | 10/2008 | Mallya et al. | 370/408 |
| 2005/0195750 | A1 * | 9/2005 | Le et al. | 370/252 |
| 2006/0002292 | A1 * | 1/2006 | Chang et al. | 370/225 |
| 2006/0193257 | A1 * | 8/2006 | Behzadi | 370/230 |
| 2007/0174691 | A1 * | 7/2007 | D'Souza et al. | 714/13 |
| 2007/0253329 | A1 * | 11/2007 | Rooholamini et al. | 370/220 |
| 2007/0286069 | A1 * | 12/2007 | Xu | 370/218 |
| 2008/0219156 | A1 * | 9/2008 | Caviglia et al. | 370/228 |
| 2008/0304407 | A1 * | 12/2008 | Umansky et al. | 370/222 |
| 2008/0316920 | A1 * | 12/2008 | Chun et al. | 370/225 |

* cited by examiner

*Primary Examiner*—Andrew Lee
(74) *Attorney, Agent, or Firm*—Sonnenschein Nath & Rosenthal LLP

(57) ABSTRACT

The present method for advanced fail-over packet label swapping for a packet network having a working path and a protection path, each of the working path and protection path interconnected by a near-end switch and a far-end switch includes: provisioning the working path, protection path, near-end switch, and far-end switch with a failure counter delay; monitoring heartbeat packets on one of the near-end switch and the far-end switch during a monitoring period to determine a number of packets that were not received by at least one of the switches during the monitoring period; determining if the determined number of packets exceeds a predetermined lost packet value for the failure counter delay; and responsive to the determined number of packets exceeding the predetermined lost packet value, delaying the monitoring for a period of time equal to the failure counter delay.

17 Claims, 3 Drawing Sheets

SYSTEM AND METHOD FOR ADVANCED FAIL-OVER FOR PACKET LABEL SWAPPING

FIELD OF THE INVENTION

The field of the invention is directed to packet systems that use address swapping to accommodate protection and/or far end failover mechanisms. More particularly the invention pertains to an intelligent advanced fail-over for decreasing excessive flipping of circuit paths caused by sporadic or systematic packet loss failures.

BACKGROUND OF THE INVENTION

Packet-protocol standards evolved to solve the present day problems associated with transferring voice, data, and video over telecom switches. For example, one present day IT protocols work at Layer 2 of the Open System Interconnection reference model ("OSI"). Data link layer devices, such as bridges and switches, operate in Layer 2 of the OSI to analyze incoming frames containing encapsulated packets, make forwarding decisions based on information contained in the frames, forward the frames toward the destination, control data flow, handle transmission errors, provide physical (as opposed to logical addressing, and manage access to the physical medium. In some cases the entire path to the destination is contained in each frame. In other cases, such as transparent bridging, frames are forwarded one hop at a time toward the destination.

Switches are used to segment a large LAN into several smaller LAN domains. Also, they can be used to connect LANs of different media, such as 10-Mbps Ethernet LAN with a 100-Mbps Ethernet LAN. Switches are also used to reduce collisions on network segments, because they provide dedicated bandwidth to each network segment. Switches forward and flood traffic based on Media Access Control ("MAC") addresses, which are unique identifiers attached to most network adaptors (NICs).

One current bridging protocol, IEEE 801.1AH, also known as "Provider Backbone Bridging" ("PBB") provides for a packet based infrastructure that allows for the efficient support of packet data, voice, and video applications. PBT is a variation of Provider Backbone Bridging ("PBB"), which allows carriers to provision engineer and protect point-to-point service. This technology is being deployed to help fill in the gaps in a typical Ethernet network by routing traffic and performing constraint based route management while protecting full QoS guarantees and providing extremely fast recovery rates after failures. PBT operates by adding statically configured routes to a nearly standard PBB network and its provisioning and management system allows a carrier to provision point-to-point trunks and services within an Ethernet network Each trunk is identified by a 16 bit VLAN ID and a 96 bit source/destination address pair.

PBT is now being updated to support carrier grade Ethernet by the addition of a path protection schema. PBT uses a provision/management system to configure the Bridge forwarding tables for the frames addresses. PBT itself is the modification of a switched network to shut off MAC learning in the core and the addition of a new Header for the traffic routing that consists of a MAC address, Working VLAN and Protection VLAN, and a service ID. Each PBT circuit is composed of a working path and a protection path that use different B-VIDs to access the same MAC address. The management must operate on both the working path and the protection path.

Essentially, all the tables that contain the MAC addresses are statically mapped, so when a packet generated by a customer-premises equipment ("CPE") or switch port (edge switch) that has a label as stated above, the VLAN mapping switches that packet to the far end. The current standards modifications include a working to protection addressing change out at the end points, so that the end points change from the working path to the protecting path when that end point stops receiving packets from the far end port or CPE. Today, the method being used to generate a flip over is the loss of a specific number of subsequent 802.1AG packets from the far end. Packet network exhibit specific errors that can cause this method of fail-over to perform poorly.

PBT uses a 802.1AG "heartbeat" packet to determine whether a circuit is active and healthy. The heartbeat packet is called an Ethernet Operation Administration Measurement ("OAM") packet. It's a session packet that goes from the source end to the destination end of the network and communicates that is has sent so many packets in between the last heartbeat packet and the current heartbeat packet. Using PBT, a network has a statically mapped working path and a protection path and the end points "listen" for the heartbeats and send packets with addressing to one of the two paths. When packets are no longer received, the end point changes it's addressing to take the alternate path. Currently, this detection is based on the lack of three sequential packets. There are two paths in a data network, and they are statically routed. Oftentimes, small amounts of packets are lost due to brief intermittent down periods in the circuit. This poor performance can be caused by circuit equipment losing synchronization (clock slips), congestion, maintenance activities (switch-overs), physical movement of the wires, electrical disturbances, and the like.

When the circuits go down, PBT switches from the working path to the protection path, and then back again, in response to each instance of three lost packets not being received at the far end. The current method causes packets to be continually readdressed until three consecutive packets are reached at the far end. Further, this flipping causes multiple hits down the line, which is stressful and damaging to the circuit equipment over time. This condition can have an echo effect when hierarchial heartbeats are used to tunnel one service through another path. This application links the failover of each tunnel to another and the delay time associated with failover can cause flipping.

In addition, today's PBT systems experience load sharing path failures, which may be caused by IEEE 802.3AD link protection with a bad path. The 802.3AD load shares two links by transmitting each packet over a different link If two switches are connected via Dense Wavelength Division Multiplexing ("DWDM") and one path goes down, then every other packet crossing that path will be lost. This path won't switch given the number of specific number of packets lost does not equal three consecutive packets lost.

SUMMARY

In one embodiment, the present System and Method for Advanced Fail-Over Provider Backbone Transport ("advanced fail-over method") includes taking inputs from the edge port and adds a MAC/VLAN label to route the packets over a statically mapped packet network In one embodiment, the static paths are static MAC forwarding tables on switches. In another embodiment, the static paths are Layer 2/3 pipes, such as Multiprotocol Label Switching ("MPLS"), Label Switching Path ("LSP"), or ATM 1483 tunnels.

The advanced fail-over method functions with PBB, such that PBT monitors the 802.1AG "Ethernet OAM packets" that are generated at specific intervals from approximately 0.01 seconds to a certain number of seconds to determine if the circuit is up. When a certain number of packets don't arrive on time, the path is determined to be dead and the PBT function at both ends change the PBT label to a new VLAN that is statically routed over another path on the packet network The present advanced fail-over method includes advanced decision measures and triggers that add intelligent fail-over timing to prevent circuit paths flipping due to sporadic loss failures and reset the detection and timing methods once the transmission of packets has stabilized. The present advanced fail-over method prevents excessive flipping by controlling and slowing the triggered fail-over when fail-over keeps occurring. It stabilizes the system and makes it tolerant of short duration outages. In one embodiment, the present advanced fail-over method bases its switch between the working path and the protection path on increasing number of missed packets, thus preventing a short-term dead circuit from causing the system to constantly be flipping between the two paths. For example, the present advanced fail-over method allows a circuit to flip between the working path and the protection path upon losing three packets. The next time it allows the circuit to flip when nine packets are missed. Then, the next time it allows the circuit to flip when twenty-seven packets are missed.

The present advanced fail-over method changes the existing fail-over trigger by increasing in a desired fashion the fail-over trigger to prevent excessive circuit flipping. Additionally, after a period of stability, the advanced fail-over method may reset the fail-over trigger to an initial setting.

In another embodiment of the present advanced fail-over method, the method monitors the 802.1AG packet information and looks for whether only half of the packets are not received at the far end. This helps the system detect shared link failures as would occur when one side of a 802.3 AD link aggregation schema failed and the switching or router layer could not detect or repair the defect.

In another embodiment of the present advanced fail-over method, the system adds an incremental amount of delay time between the time traffic starts and it restarting counting lost packets. It dynamically increases the amount of packet failures before triggering the switch between two pathways, and it increases the amount of time it waits before it monitors and counts again. After a period of stability both the detection metric and the delay to count metric are reset to their initial state.

DETAILED DESCRIPTION OF THE DRAWINGS

Figure 1:
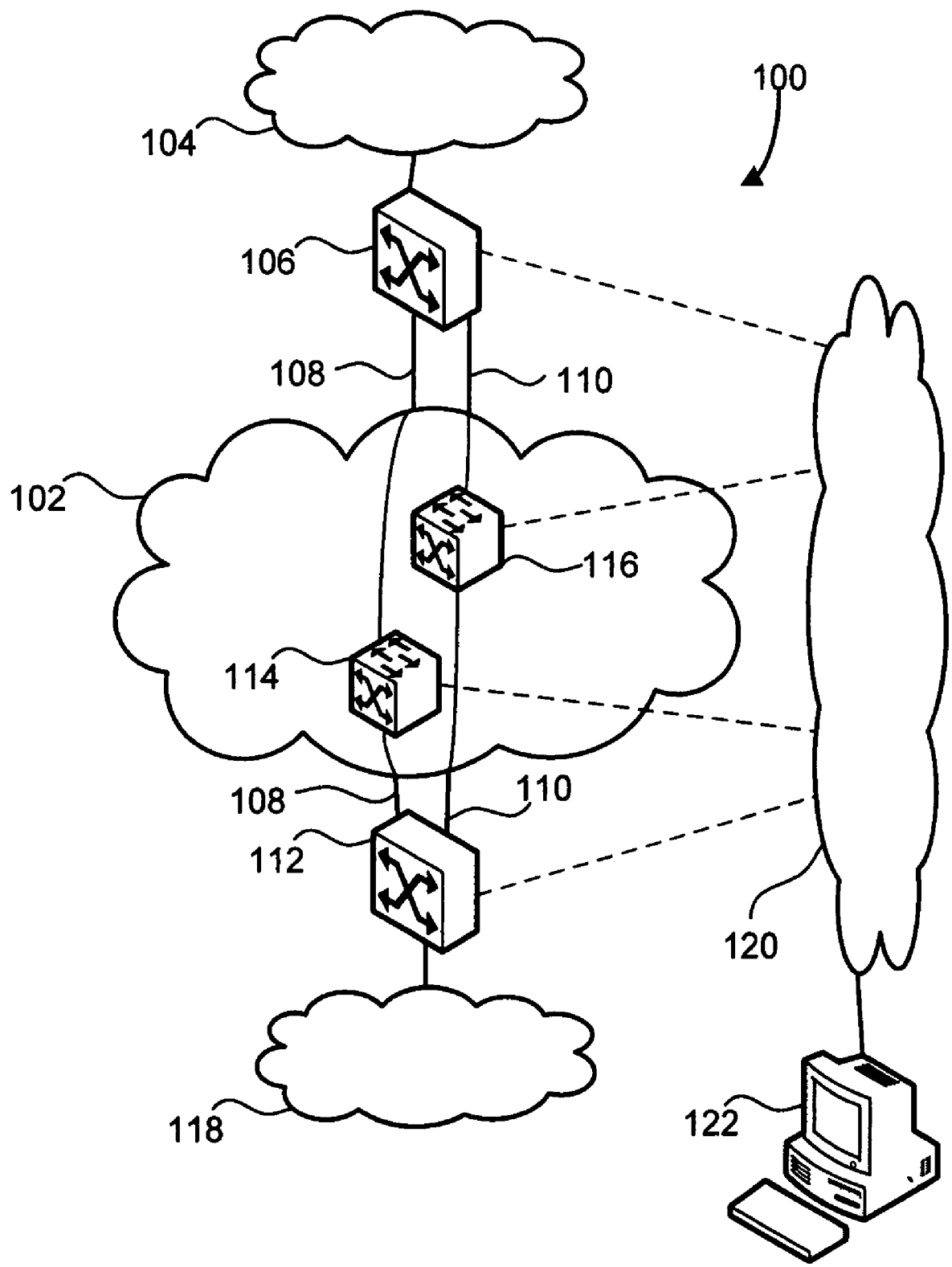
FIG. 1 illustrates a network diagram including multiple Ethernet networks interconnected across an Packet network, with dual path mapping to facilitate Provider Backbone Transport with an advanced fail-over method according to an embodiment of the present invention.

In the drawings, like or similar elements are designated with identical reference numerals throughout the several views and figures thereof, and various depicted elements may not be drawn necessarily to scale. FIG. 1 illustrates an embodiment 100 of a typical packet network including multiple packet networks ("LANs") 104 and 118 interconnected across a packet network that supports dual paths as would be provisioned to support Provider Backbone Transport ("PBT") network 102 in which the advanced fail-over method operates. Typically, the PBT network 102 operates in Layer 2 of the OSI and typically includes data link communication devices, or data link layer devices, such as bridges and switches. Generally, bridges and switches extend the effective length of a LAN by permitting the attachment of distant stations.

The PBT network 102 may be an layer 2 or layer 3 network facilitating layer 2 tunnels or any other packet network that supports layer 2 tunneling such as asynchronous transfer mode. In another embodiment of the present advanced fail-over method, LAN switches are used to interconnect multiple LANs 104 and 118. A working path (VLAN X) 108 and a protection path (VLAN Y) 110 connect the end ports of a switch 106 to the end port of a switch 112. The provisioned path for the PBT over network 102 further may include additional network switches 114 and 116.

Some common switching technologies used with the present method for advanced fail-over include store-and-forward switching and cut-through switching. Typically, store-and-forward switching requires that an entire frame, or encapsulated packet(s), must be received before it is forwarded. In cut-through switching, the switch begins forwarding the frame when enough of the frame is received to make a forwarding decision.

In addition, the present advanced fail-over method may operate with common bridges include transparent bridging as found in Ethernet environments, source-route bridging as commonly found in Token Ring environments, and source-route transparent bridging as commonly found in mixed Ethernet/Token Ring environments.

In addition, the present advanced fail-over method may operate with common bridges include transparent bridging as found in Ethernet environments, source-route bridging as commonly found in Token Ring environments, and source-route transparent bridging as commonly found in mixed Ethernet/Token Ring environments.

A provisioning and management system 120 maps the MAC addresses of frames and packets within the LAN 104, LAN 118, switch 106, switch 112, and PBT network 102. Preferably, it also takes a 802.1AD switch and changes it to a statically-mapped device to map MAC address inside of the LAN 104, LAN 118, and the PBT network 102. In one embodiment, the provisioning and management system 120 is in communication with a provisioning and management system 122 for inputting and transmitting provisioning and management information to the LAN 104, LAN 118, switch 106, switch 112, and PBT network 102.

In one aspect, both the switch 106, such as the CPE, and the switch 112 both already have the ability to put a second label or MAC address for the protection path onto their frames/packets. The protection path modification in the switches switch 106 and 112 provide the alternate path, protection path 110, for the circuit should the working path 108 cease working or go down. These switches 106 and 112 are provisioned by the provisioning and management system 120. This prevents both ends of the system from chaining. In one aspect, the switches 106 and 112 are located at the edge of the PBT network PBT network 102. In another aspect, switches 106 and 112 are located at the customer site itself, so that could be a metro Ethernet edge switch. In yet another aspect, the switches 106 and 112 are a switch at the customer's building.

The provisioning and management system 120 includes an Element Management System ("EMS") and is operated through a user network interface typically via the provisioning and management system 122. The present advanced fail-over method includes a state engine that stabilizes a PBT from circuit flipping by adjusting the amount of time between analyzed heartbeat packets and the number of packets to be analyzed as delivered at one switch 106 or the other switch 112 of the internet switching network 100. Switch 106 and switch 112 are also known as a user network interface. This is where user data traffic is received and put into the PBT network 102. In one aspect, user network interface is where the second MAC address is put on the frame/packet to translate it across the PBT network 102.

In one embodiment, the provisioning and management system 122 provisions the paths to the labels/frames of each packet traveling through the PBT network 102. In one embodiment, the provisioning and management system 122 is a computer system that presents user interfaces (FIG. 2) to a user for operating, provisioning, and managing the internet switching network 100. The provisioning and management system 122 include the advanced fail-over parameters for switches 106 and 112. The provisioning aspect of the advanced fail-over method includes synchronizing these advanced fail-over parameters among the User Network Interfaces and Virtual User Interfaces know as Ethernet Virtual Circuits on switches 106 and 112 for a particular CPE, customer, or user as the case may be. In addition, the provisioning and management system 122 addresses the static networking of the switches 106 and 112, network switches 114 and 116, and frames/packets all the way through the PBT network 102.

In one embodiment, the network switches 114 and 116 may include one or more switches in between switch 106 and switch 112 than those shown in FIG. 1. The provisioning and management system 122 statically maps those paths of those switches with those labels of the particular frames/packets over the different lengths of the PBT network 102. Thus, for example, if the heartbeat packet on the working path 108 becomes inoperable, then those N-ports on the network switches 112 and 106 would swap out and add the other label immediately, so the packets would start going over the protection path 110. Further, if the protection path 110 became inoperable, then the network switches 112 and 106 would swap out and add the first label immediately, so that packets would start going over the working path 108. Thus switches and packets swap back and forth automatically, but in a stabilized fashion as described further below.

Figure 2:
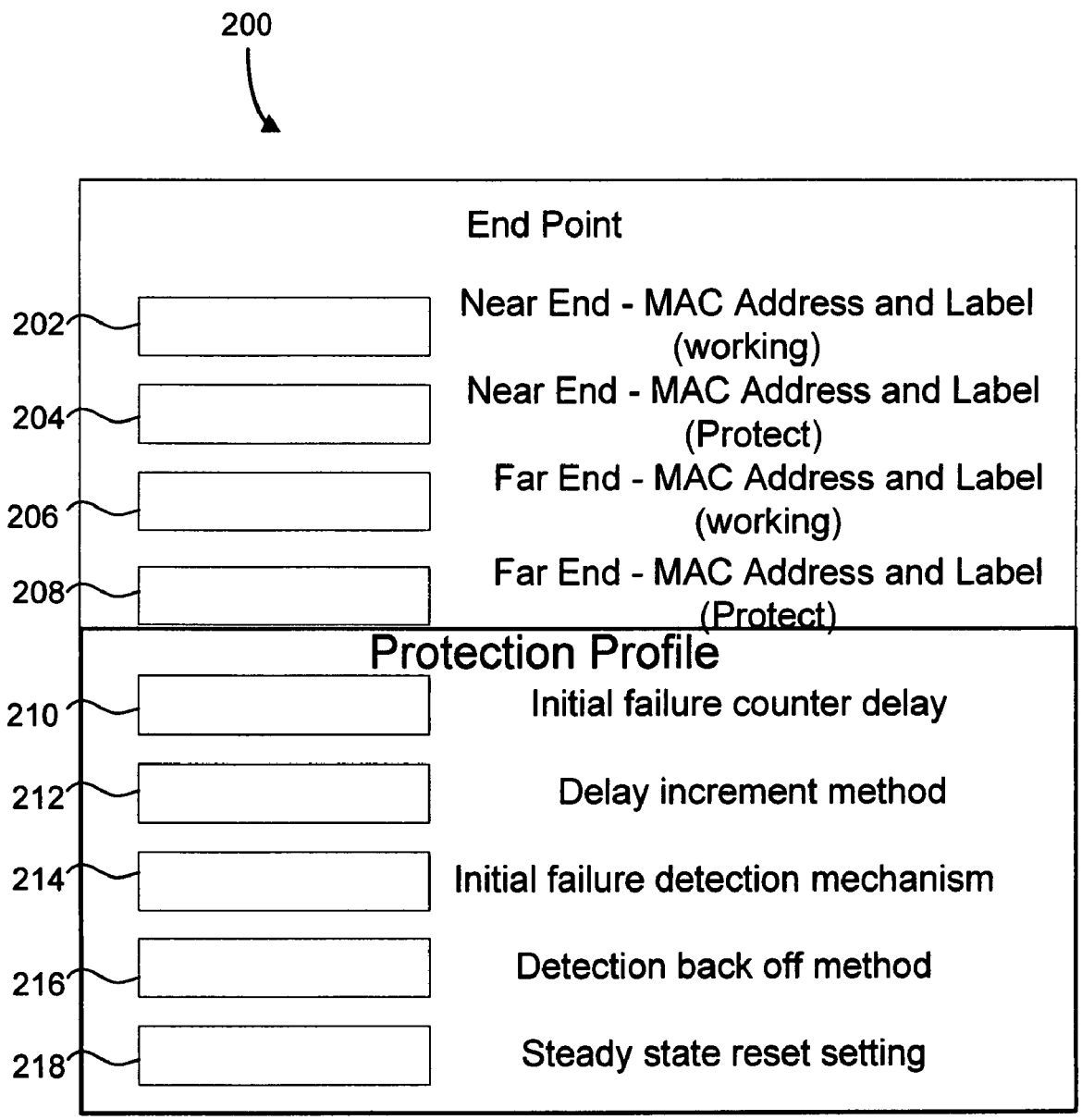
FIG. 2 illustrates a user interface for the advanced fail-over method according to an embodiment of the present invention.

FIG. 2 illustrates an embodiment 200 of an exemplary display of a user interface for the provisioning and management system 122 that includes data fields and MAC addresses for the switches and packets for a particular system. For example, the Near End-MAC Address and Label (Working) 202 includes the MAC address and label for the switch 112 and working path 108 for the working path. The Near End-MAC Address and Label (protect) 204 includes the MAC address and label for the switch 112 and working path 108 for the protection path. The Far End-MAC Address and Label (Working) 206 includes the MAC address and label for the switch 106 and working path 108 for the working path. The Far End-Mac Address and Label (Protect) 208 includes the MAC address and label for the switch 106 and working path 108 for the protection path.

In one embodiment, the advanced fail-over method monitors the incrementaion of the counting delay, and failover trigger and reports them to the EMS. The term "trigger" or "triggering" means when the advanced fail-over method of the PBT network 102 switches the paths from the working path 108 to the protection path 110 throughout the internet switching network 100 and PBT network 102, or vice versa. The counting delay methodology could be any type of delay measure meaning time, number of packets, or other delay mechanism. The delay increment can be statically assigned, or mathematically generated. The failover trigger mechanism can be any mathematical or pattern of lost or delayed packets. The failover based trigger increments with some type of mathematical increment, or preset pattern being statically dictated. The delay counter and trigger mechanism reset value can also be related to the current.

The user interface 200 preferably includes an Initial failure counter delay 210 that is the time delay the advanced fail-over method waits after an initial failure before it begins to monitor again the packet throughputs in the PBT network 102. Preferably, the value for the Initial failure counter delay 210 is a time value, such as seconds or minutes and the like. The advanced fail-over method monitors the number of packets that are not received at either switch 106, switch 112 or both of the PBT network 102 between two heartbeat packets. For example, if the initial failure is set for 1 packet, then the time value in the Initial failure counter delay 210 is the time delay that the advanced fail-over method will delay before it resumes monitoring lost packets at either switch 106, switch 112, or both. If the value in the Initial failure counter delay 210 is 5 seconds, then the advanced failover method will delay 5 seconds before it begins monitoring lost packets at either switch 106, switch 112, or both. In another example, if the initial failure is set for 5 packets, then the time value in the Initial failure counter delay 210 is the time delay that the advanced fail-over method will delay before it resumes monitoring lost packets at either switch 106, switch 112, or both. If the value in the Initial failure counter delay 210 is 20 seconds, then the advanced fail-over method will delay 20 seconds before it begins monitoring lost packets at either switch 106, switch 112, or both. Some additional exemplary delays include 10 seconds or 1 second to 100 seconds, or incrementally 1, 2, 3, 4, 5 seconds increasing by a second every time. The delay could be linear, logarithmic, or exponential, such as 1 second, 10 seconds, 100 seconds, and 1000 seconds.

The user interface 200 also preferably includes a Failure backoff method 212 that is a value of the number of times a certain number or pattern of lost packets or packet types are not received at the far end or switch 112 and then backs off or delays the monitoring of the packets for a period of time. For example, if the value in the Initial failure detection mechanism 214 is 3 and the value in the Initial failure counter delay 210 is 3, then the advanced fail-over method will wait until it monitors three sets of three lost packets that were not received at either switch 106, switch 112, or both before the advanced fail-over method will delay the monitoring of the packets for another 3 seconds before monitoring for another 3 lost packets on either the working path 108 to the protection path 110, or vice versa.

Further, the user interface 200 preferably includes an Initial failure detection mechanism 214 that is a value for the number of lost packets not received at either switch 106, switch 112, or both that trigger either the Initial failure counter delay 210 or the Failure backoff method 212. For example, if the value for Initial failure detection mechanism 214 is 3, then when the advanced fail-over method detects that three packets were lost at either switch 106, switch 112, or both, this affects either Initial failure counter delay 210 or Failure backoff method 212.

The user interface 200 also includes a Detection back off method 216 that increases either value in Initial failure detection mechanism 214 or the value in Initial failure counter delay 210 or both. For example, if the value in Initial failure detection mechanism 214 is 3, then the Detection back off method 216 may increase this value to 4 or 5 to slow down the switching or triggering the switch between the working path 108 and the protection path 110. In another example, if the value for Initial failure counter delay 210 is 5 seconds, then it may increase the value to 10 seconds or 20 seconds to slow down the switching between the working path 108 and the protection path 110 to stabilize the PBT network 102.

Additionally, the user interface 200 includes a Steady state reset timer 218 resets the value in any of the Initial failure counter delay 210, Failure backoff method 212, Initial failure detection mechanism 214, or Detection back off method 216.

Additionally, the advanced fail-over method provides for customized settings to the Initial failure counter delay 210, Failure backoff method 212, Initial failure detection mechanism 214, Detection back off method 216, and Steady state reset timer 218 to account for a particular profile of the customer, files, or data being sent over the PBT network 102. For example, if the advanced fail-over method uses an exponential algorithm for the Failure backoff method 212 for file A versus for File B, then the advanced fail-over method may wait for 3 packets to fail before increasing the trigger to 5 packets. The advanced fail-over method provides for handling of different data traffic with different methods. For example, if the data traffic is critical, then the delays may be stepped up in smaller increments, than if the data traffic is non-critical. The advanced fail-over method provides for different profiles for different traffic and services. The advanced fail-over method of the EMS is programmed to create specific profiles for specific service types, which is done preferably when a particular system is provisioned or set up.

Further, the advanced fail-over method includes a threshold dropping feature that once an increased delay, such as an exponential delay, is reached other functional delays are effected.

As discussed above, the EMS of the advanced fail-over method provisions the far-end port of the switch 106 that it's destination address is the near-end port of the switch 112 or vice versa. The EMS of the advanced fail-over method tells the near end switch 112 where the far end switch 106 is, so that it knows how to label it, and the two addresses for the working path 108 and the protection path 110. The advanced fail-over method then further add to that information the Initial failure counter delay 210, Failure backoff method 212, Initial failure detection mechanism 214, Detection back off method 216, Steady state reset timer 218, and if there are going to be multiple profiles that the PBT network 102 needs to take into account. For example, one profile may be a slow exponential fail-over profile and one profile may be a fast exponential fail-over profile, so the advanced fail-over method characterizes the PBT network 102 based on the different methods programmed into its system.

The advanced fail-over method determines how many packets or what pattern of packets are encountered or missed in the PBT network 102, thus it actually tracks the number of missed packets and the amount of time between the last one and the swap over not between working path 108 and protection path 110. For example, if the value for the Initial failure detection mechanism 214 is 3, the advanced fail-over method will delay or backoff from monitoring the heartbeat packets for a period of time before it triggers the switch from working path 108 to protection path 110 or vice versa, and then it may be programmed to time out or delay before you start monitoring and counting the lost packets again. In another example, the it advanced fail-over method is set for an exponential delay, it's not going to trigger the switch from working path 108 to protection path 110, or vice versa for 1 second. During that 1 second approximately 10,000 packets may be sent across the PBT network 102. If the advanced fail-over method counts three lost packets it may not be programmed to trigger the switch. But, it may start counting lost packets after that, and then back-off at a later time. In addition, after a triggered switch from the working path 108 to the protection path 110, or vice versa the advanced fail-over method delay for monitoring and counting lost packets may increase.

Figure 3:
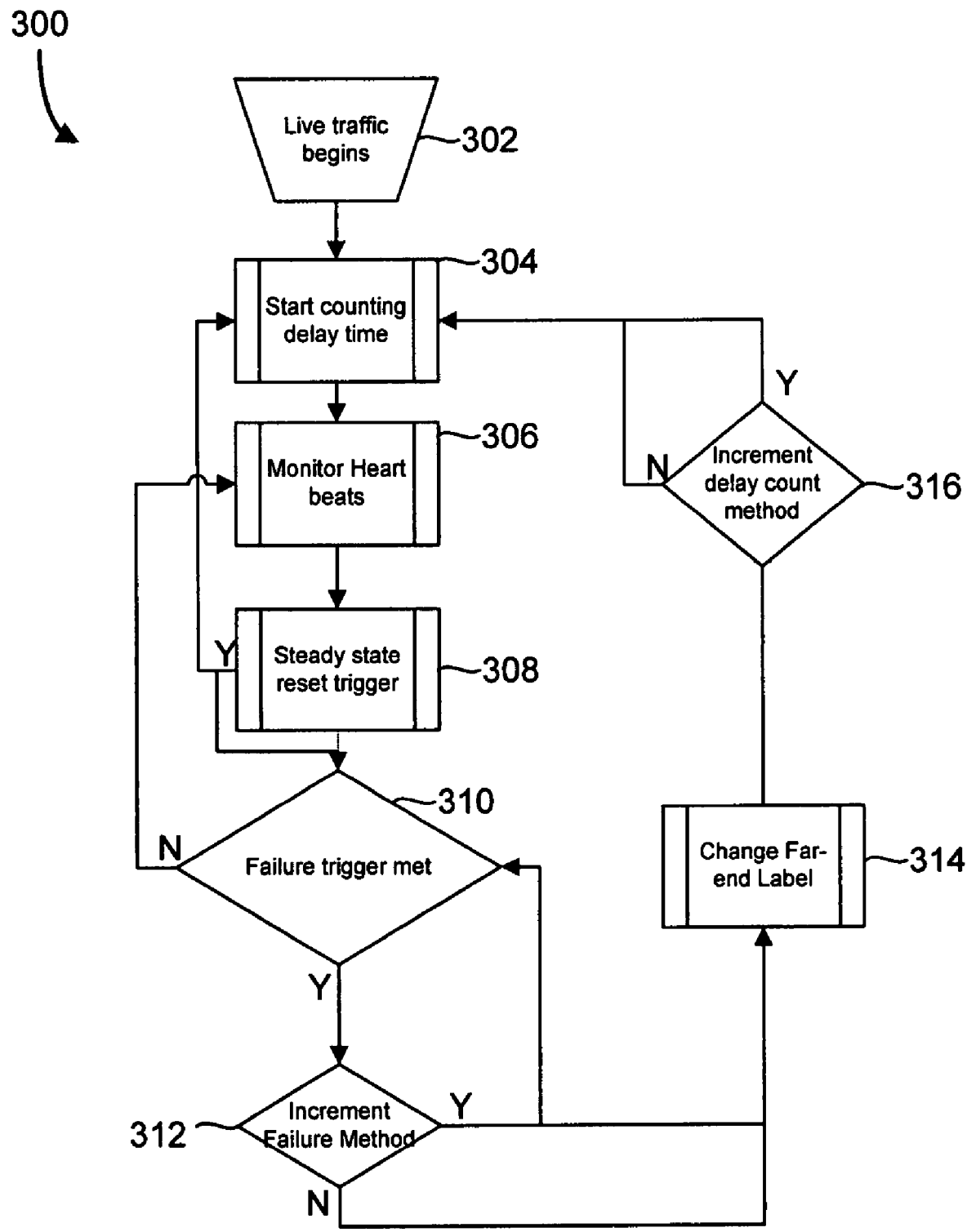
FIG. 3 illustrates a block flow diagram for the advanced fail-over method according to an embodiment of the present invention.

FIG. 3 illustrates an embodiment 300 of a block flow diagram of an advanced fail-over method according to the present invention. In step 302, live data traffic begins on the PBT network 102. This traffic flow can be from the working path 108 to the protection path 110, or vice versa. In step 304, the advanced fail-over method delays the monitoring of a heartbeat for a fail-over according to its provisioned value. This includes a counter start that is going to delay or is going to start right away depending on the delay value.

In step 306, the advanced fail-over method monitors those heartbeats and it's going to look for a failure and if it doesn't detect a failure, it's just going to just keep monitoring the PBT network 102. If it detects a failure, it's going to incrementally increase the delay in which to monitor the failures. In step 308, the values for monitoring and triggering a switch are reset due to a steady state. This can occur when the advanced fail-over method hasn't detected any lost packets over a predetermined period of time.

In step 310, once the trigger threshold is met, then the advanced fail-over method will trigger the switch between the working path 108 and the protection path 110, or vice versa, then it's going to add some delay before it starts monitoring and counting again. Then it's going to just start monitoring again. In step 312, one or all of the values for the Failure backoff method 212 and the Detection back off method 216 are increased for additional monitoring. In step 314, the far-end label is changed to affect the switch from the working path 108 to the protection path 110 or vice versa. In step 316, the Initial failure counter delay 210 is increased for additional monitoring.

There has been described an advanced fail-over method. It should be understood that the particular embodiments described within this specification are for purposes of example and should not be construed to limit the invention. Further, it is evident that those skilled in the art may now make numerous uses and modifications of the specific embodiment described, without departing from the inventive concepts. For example, different types and numbers of switches may be used without departing from the inventive concepts.

What is claimed:

1. A method for advanced fail-over packet label swapping for packet networks having a working path and a protection path, each of said working path and protection path interconnected by a near-end switch and a far-end switch comprising:

provisioning said working path, protection path, near-end switch, and far-end switch with a failure counter delay;

monitoring one of the group consisting of a heartbeat, live traffic, and patterns of packets on one of said near-end switch and said far-end switch during a monitoring period to determine a number of packets that were not received by at least one of said switches during said monitoring period;

determining if said determined number of packets exceeds a predetermined lost packet value for said failure counter delay; and responsive to said determined number of packets exceeding said predetermined lost packet value, delaying said monitoring for a period of time equal to said failure counter delay.

2. The method for advanced fail-over packet label swapping for packet networks claim 1 further comprising:
responsive to said determined number of packets exceeding said predetermined lost packet value, increasing said predetermined lost packet value.

3. The method for advanced fail-over packet label swapping for packet networks of claim 1 further comprising:
responsive to said determined number of packets exceeding said predetermined lost packet value, increasing said period of time for said failure counter delay.

4. The method for advanced fail-over packet label swapping for packet networks of claim 1 wherein said provisioning further includes:
provisioning said working path, protection path, near-end switch, and far-end switch with said predetermined lost packet value.

5. The method for advanced fail-over packet label swapping for packet networks of claim 1 further comprising:
responsive to said determined number of packets exceeding said predetermined lost packet value, switching from said working path to said protection path.

6. The method for advanced fail-over packet label swapping for packet networks of claim 1 further comprising:
responsive to said determined number of packets exceeding said predetermined lost packet value, switching from said protection path to said working path.

7. A method for increasing the delay time for an advanced fail-over packet label swapping for a packet network having a working path and a protection path, each of said working path and protection path interconnected by a near-end switch and a far-end switch comprising:
provisioning said working path, protection path, near-end switch, and far-end switch with a failure counter delay;
switching a data traffic from said working path to said protection path;
monitoring heartbeat packets from said data traffic on said far-end switch of said protection path during a monitoring period to determine a number of packets that were not received by said far-end switch on said protection path during said monitoring period;
determining if said determined number of packets exceeds a predetermined lost packet value for said failure counter delay; and
responsive to said determined number of packets exceeding said predetermined lost packet value, delaying said monitoring for a period of time equal to said failure counter delay.

8. The method for increasing the delay time for an advanced fail-over packet label swapping for a packet network of claim 7 further comprising:
responsive to said determined number of packets exceeding said predetermined lost packet value, increasing said predetermined lost packet value.

9. The method for increasing the delay time for an advanced fail-over packet label swapping for a packet network of claim 7 further comprising:
responsive to said determined number of packets exceeding said predetermined lost packet value, increasing said period of time for said failure counter delay.

10. The method for increasing the delay time for an advanced fail-over packet label swapping for a packet network of claim 7 wherein said provisioning further includes:
provisioning said working path, protection path, near-end switch, and far-end switch with said predetermined lost packet value.

11. The method for increasing the delay time for an advanced fail-over packet label swapping for a packet network of claim 7 further comprising:
responsive to said determined number of packets exceeding said predetermined lost packet value, switching from said protection path to said working path.

12. A system for advanced fail-over packet label swapping for a packet network having a working path and a protection path, each of said working path and protection path interconnected by a near-end switch and a far-end switch comprising:
means for provisioning said working path, protection path, near-end switch, and far-end switch with a failure counter delay;
means for monitoring heartbeat packets on one of said near-end switch and said far-end switch during a monitoring period to determine a number of packets that were not received by at least one of said switches during said monitoring period;
means for determining if said determined number of packets exceeds a predetermined lost packet value for said failure counter delay; and
responsive to said determined number of packets exceeding said predetermined lost packet value, means for delaying said monitoring for a period of time equal to said failure counter delay.

13. The system for advanced fail-over packet label swapping for a packet network of claim 12 further comprising:
responsive to said determined number of packets exceeding said predetermined lost packet value, means for increasing said predetermined lost packet value.

14. The system for advanced fail-over packet label swapping for a packet network of claim 12 further comprising:
responsive to said determined number of packets exceeding said predetermined lost packet value, means for increasing said period of time for said failure counter delay.

15. The system for advanced fail-over packet label swapping for a packet network of claim 12 wherein said provisioning further includes:
means for provisioning said working path, protection path, near-end switch, and far-end switch with said predetermined lost packet value.

16. The system for advanced fail-over packet label swapping for a packet network of claim 12 further comprising:
responsive to said determined number of packets exceeding said predetermined lost packet value, means for switching from said working path to said protection path.

17. The system for advanced fail-over packet label swapping for a packet network of claim 12 further comprising:
responsive to said determined number of packets exceeding said predetermined lost packet value, means for switching from said protection path to said working path.

* * * * *